United States Patent [19]

Spector

[11] 4,128,966
[45] * Dec. 12, 1978

[54] INFLATABLE TERRARIUM ASSEMBLY WITH CONTROLLED ENVIRONMENT

[75] Inventor: Donald Spector, Union City, N.J.

[73] Assignee: Applied Research Commodities Ind., Inc., Hyattsville, Md.

[*] Notice: The portion of the term of this patent subsequent to Dec. 7, 1993, has been disclaimed.

[21] Appl. No.: 740,664

[22] Filed: Nov. 10, 1976

Related U.S. Application Data

[63] Continuation-in-part of Ser. No. 632,708, Nov. 17, 1975, Pat. No. 3,995,396, which is a continuation-in-part of Ser. No. 532,518, Dec. 17, 1974, Pat. No. 3,939,607.

[51] Int. Cl.² ............................................. A01G 9/02
[52] U.S. Cl. ........................................ 47/69; 422/9; 47/DIG. 2; 273/101; 428/17
[58] Field of Search ................. 47/69, DIG. 2, 17, 55; 428/17, 24; 21/2.5 R; 273/95 AA, 101, 119 B

[56] References Cited

U.S. PATENT DOCUMENTS

| 865,965 | 9/1907 | Earp-Thomas | 47/69 |
|---|---|---|---|
| 1,678,046 | 7/1928 | Holmes | 47/DIG. 2 |
| 2,616,780 | 11/1952 | Atkinson et al. | 21/2.5 R |
| 2,632,268 | 3/1953 | Newhall | 47/DIG. 2 |
| 2,994,424 | 8/1961 | Selby et al. | 47/DIG. 2 |
| 3,188,166 | 6/1965 | Dietz et al. | 21/2.5 R |
| 3,320,697 | 5/1967 | Larsen | 47/69 |
| 3,563,780 | 2/1971 | Waszkiewicz | 428/24 |
| 3,645,766 | 2/1972 | Mazzucato | 428/24 |
| 3,673,733 | 7/1972 | Allen | 47/17 |
| 3,704,088 | 11/1972 | Nagel et al. | 21/2.5 R |
| 3,802,122 | 4/1974 | Dickinson | 47/55 |
| 3,995,396 | 12/1976 | Spector | 47/69 |

FOREIGN PATENT DOCUMENTS 978985 1/1965 United Kingdom ............... 47/DIG. 2

OTHER PUBLICATIONS

Hatton, T. T., et al. "Influence of Ethylene on Stored Late-Season 'Marsh' Grapefruit," *Hortscience, vol. 8(2), Apr. 1973, pp. 101 and 102.*
Klingman, G. C., "Dormancy of Seed," *Weed Control as a Science,* 1966, published by John Wiley & Sons, Inc., N.Y., pp. 40 and 41.

*Primary Examiner*—Edgar S. Burr
*Assistant Examiner*—James R. Feyrer
*Attorney, Agent, or Firm*—Michael Ebert

[57] ABSTRACT

A collapsible terrarium assembly which is inflatable to assume a desired configuration for protectively housing a plant or other organic material in a controlled environment adapted to promote plant growth or to stimulate organic activity. The structure is constituted by a disc-like base and a replaceable dome attachable thereto by means of a coupling ring. The dome is formed by a flexible plastic envelope whose rim is provided with an annular skirt that is interposed between the coupling ring and the base to define a hermetically-sealed enclosure. The envelope is provided with a two-way valve, which in one position makes it possible to exhaust the air from the enclosure, and in another position to inflate the dome with an inert gas to create a controlled environment.

11 Claims, 4 Drawing Figures

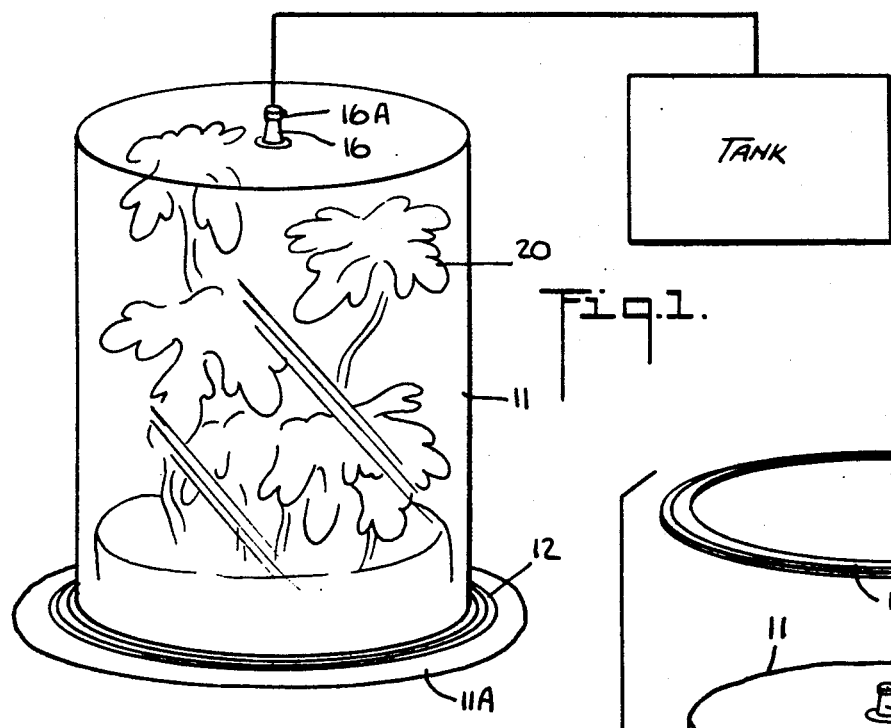
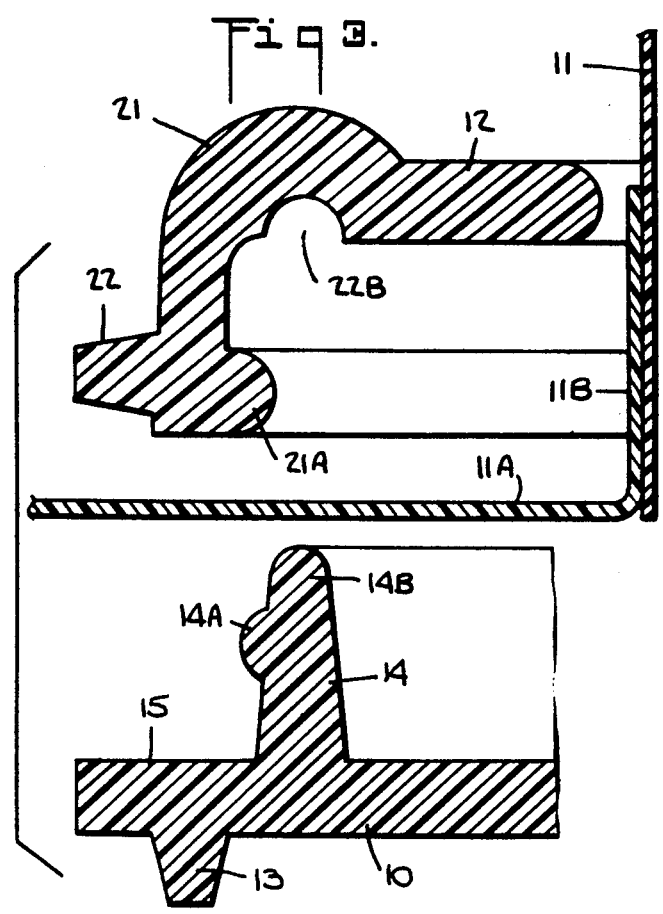
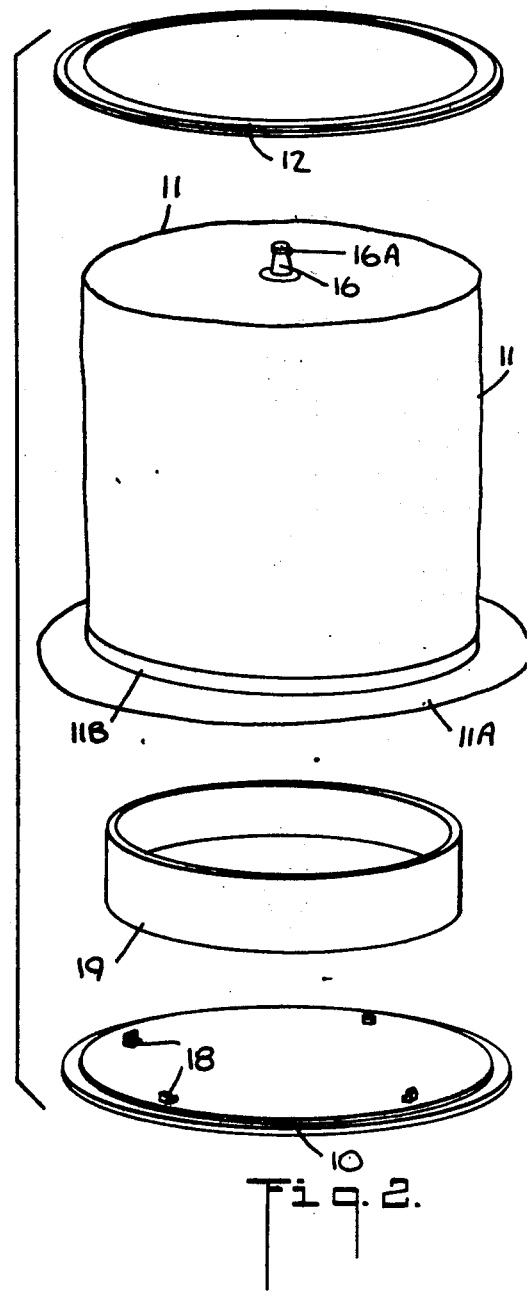

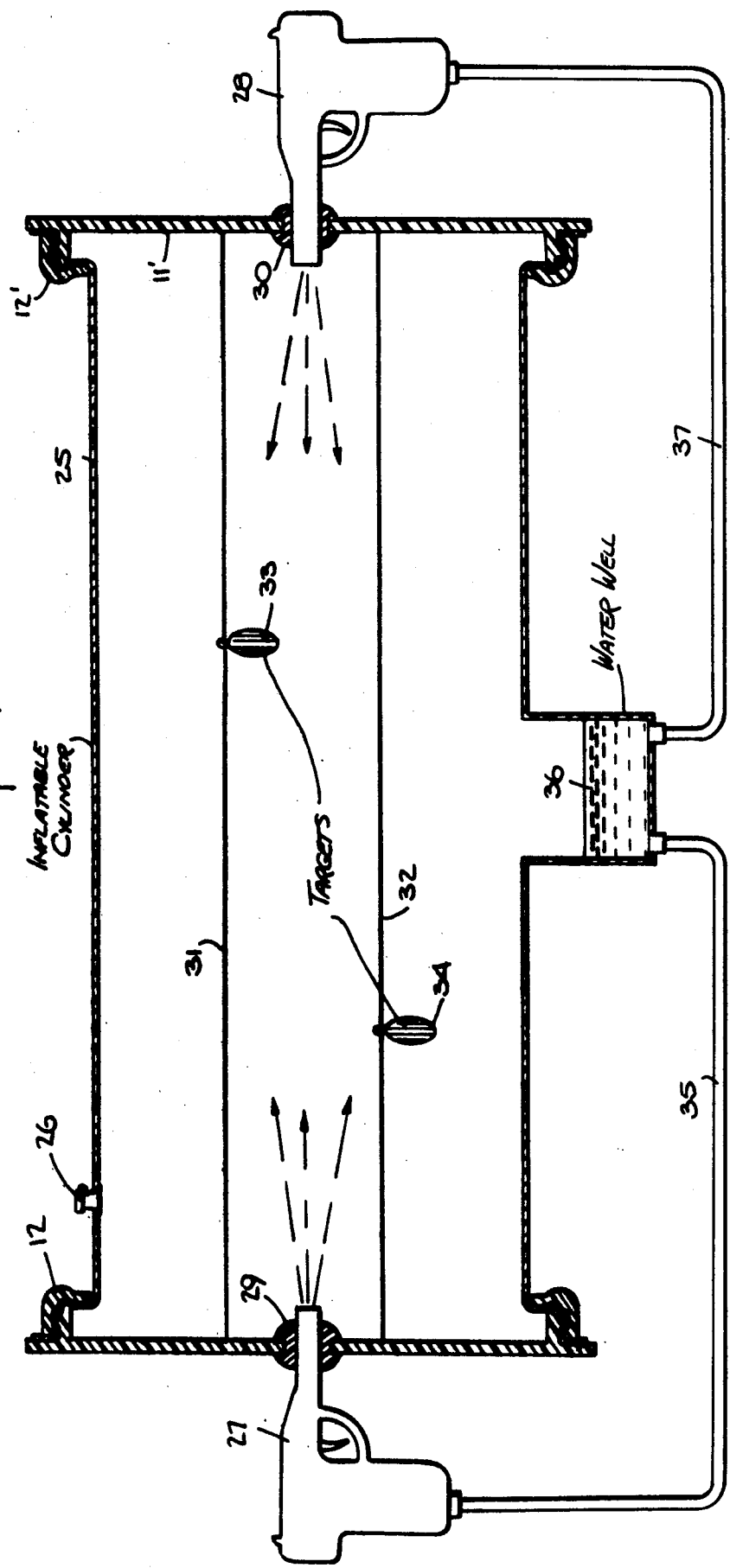

INFLATABLE TERRARIUM ASSEMBLY WITH CONTROLLED ENVIRONMENT

RELATED APPLICATION

This application is a continuation-in-part of my copending application Ser. No. 632,708, now U.S. Pat. No. 3,995,396, filed Nov. 17, 1975, which in turn is a continuation-in-part of my original application Ser. No. 532,518, filed Dec. 17, 1974, now U.S. Pat. No. 3,939,607.

BACKGROUND OF INVENTION

This invention relates generally to a hermetically-sealed collapsible terrarium assembly which includes a replaceable dome that is inflatable to assume a desired configuration, and more particularly to a terrarium of the type which is inflated with an inert gas or other controlled atmosphere.

The traditional terrarium is a fully enclosed, small container, wholly or predominantly made of glass or other rigid transparent material, the terrarium being adapted for the indoor cultivation of moisture-loving plants. The earliest form, known as a Wardian case, was invented by an English botanist in the 19th century, the case being constituted by a box-like glass dome fitted over a metal, earthenware or wooden base serving as a pot for growing living plants. Normally, moisture from an exposed plant is dissipated into the atmosphere through transpiration, so that the plant must be watered at frequent intervals, but in a terrarium the loss of moisture is slight and it is not necessary to replenish the water except occasionally.

Because of the growing popularity of terrariums, they are now mass-produced and commercially available in rigid, transparent plastic form. The terrarium consists of a plastic base having a pot formation for receiving plant soil and a plastic dome or shell which fits over the base. Plastic terrariums come in a range of sizes, and the larger ones are not only fairly expensive, but because of their size they are not easily stored when not in use, particularly in a small apartment dwelling.

But a more important drawback of existing types of rigid glass or plastic terrariums is that they are not hermetically sealed, so that even though these enclosed terrariums reduced the loss of moisture, they are incapable of maintaining an atmosphere of high humidity of the type necessary, for example, in promoting the growth of certain exotic or tropical plants. It is for this reason that when bell jars are used as terrariums, it is the present practice to apply grease or oil to the rim of the jar in order to improve the seal thereof.

With a view toward overcoming the drawbacks of existing types of rigid terrariums, there is disclosed in the above-identified copending patent application, whose entire disclosure is incorporated herein by reference, a terrarium assembly which makes use of a flexible plastic dome mountable on a base to create a hermetically sealed enclosure, the dome being inflatable to assume a desired configuration.

In the collapsible terrarium assembly disclosed in my copending application, a disc-like base structure is provided having a circular ridge formed thereon adjacent its periphery, which ridge is adapted to cooperate with a snap-on coupling ring. Also provided is a dome formed by an open bag of clear flexible plastic material having a circular rim whose diameter is slightly smaller than the diameter of the ridge, the bag having an annular skirt secured thereto and extending outwardly therefrom.

In assembling the terrarium structure, the skirt of the bag is interposed between the coupling ring and the ridge and the ring is snapped onto the ridge, thereby anchoring the bag and hermetically sealing the dome. The bag is provided with a valve having a mouthpiece whereby the dome may be inflated by the user to produce an atmosphere therein which is rich in carbon dioxide.

SUMMARY OF INVENTION

In view of the foregoing, the main object of this invention is to provide a collapsible terrarium assembly which is hermetically-sealed and is inflatable with a selected gas to afford a controlled environment for plants and other organic material to promote the growth of the plant or to stimulate organic activity.

More specifically, it is an object of this invention to provide an assembly of the above type which makes use of inflatable domes of clear flexible plastic material having a two-way valve attached thereto, which domes are replaceable, whereby the same assembly may be used with domes of different size and configuration which may be inflated through the valve, the valve having an exhaust position to facilitate the displacement of air from the dome.

A significant advantage of an inflatable terrarium in accordance with the invention is that it is capable of functioning as a gas isolation chamber to increase the rate of seed germination, to prolong the life of cut flowers, to ripen fruits more rapidly, to promote the growth of anerobic bacteria, to fumigate plants, as well as for a variety of other useful applications which heretofore have required specialized and relatively costly equipment.

Briefly stated, these objects are attained in a collapsible terrarium assembly constituted by a disc-like base and a replaceable dome formed of clear flexible plastic material attachable thereto by means of a coupling ring to form a hermetically-sealed enclosure, the dome being provided with a two-way valve which in one position makes it possible to exhaust the air from the enclosure and in another position to inflate the dome with a gas to create a controlled environment appropriate to the produce enclosed in the terrarium.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a preferred embodiment of a collapsible terrarium assembly in accordance with the invention, as shown in the inflated state;

FIG. 2 is an exploded view of the assembly;

FIG. 3 is a detail showing the relationship between the coupling ring and the circular ridge formed on the base of the assembly; and FIG. 4 is a schematic representation of a water-gun toy which makes use of a terrarium in accordance with the invention.

DESCRIPTION OF INVENTION

The Assembly Structure

Referring now to the drawings and more particularly to FIGS. 1 to 3, a terrarium assembly in accordance with the invention comprises a disc-shaped base 10, an inflatable dome 11 and a coupling ring 12.

Base 10, which is formed of relatively rigid plastic material such as polypropylene, polyethylene or polyester, is provided at its undersurface with a circular pedestal 13 which serves to raise the base slightly above ground level. Formed on the upper face of base 10 is a circular ridge 14, the ridge being adjacent to and concentric with the periphery of the base to define an outer ledge 15. Ridge 14 is provided of the base to define an outer ledge 15. Ridge 14 is provided with a circular bead 14A projecting laterally from the outer surface thereof.

Dome 11 is in the form of an open envelope or bag formed of transparent plastic flexible film material, such as polyvinyl chloride, "Mylar" or any other suitable clear flexible plastic film which is impermeable to air and may therefore be inflated. Dome 11, in the embodiment shown in FIG. 1, possesses a generally cylindrical form having a flat top on which is centrally installed a two-way valve 16 provided with exhaust outlet 16A, the valve having an inlet which may be coupled to a line leading to a tank of a compressed gas such as pure nitrogen.

Secured to the open circular mouth of the plastic bag 11 and extending outwardly therefrom is a circular skirt 11A having an annular flange 11B which encircles the bag, the skirt being bonded to the mouth of the bag at the junction of the skirt and flange. The function of the flange is to stiffen the mouth and make the installation of the dome easier. The skirt and flange may be formed of the same flexible plastic material as the bag.

Mounted on base 10 and raised slightly thereabout by an array of steps 18 is a cylindrical shell 19 which defines a planter for receiving soil, the narrow space between the base and the lower edge of the shell permitting the return flow to the soil of moisture evaporated from a plant 20 contained in the planter and condensed on the inner surface of the dome. Thus the water is recycled, and there is no need to water the plant after it is placed within the terrarium.

Coupling ring 12, as best seen in FIG. 3, is formed of resilient plastic material and is provided with a downwardly-curved brim 21 which terminates in an inwardly-directed bead 21A. The junction between brim 21 and the body of ring 12 has a circular groove 21B formed therein adapted to receive the head 14B of ridge 14.

The dimensions of the coupling ring relative to the diameter of ridge 14 are such that groove 21B on the ring registers with head 14B on the ridge, and the inwardly-projecting bead 21A on the ring registers with the outwardly-projecting bead on ridge 14A, so that when the ring is brought down on the ridge, the two beads abut each other to prevent the ring from being seated on ledge 15 on the base. However, since brim 21 of the coupling ring is yieldable, by pressing down on the ring, a snap action is effected whereby the brim is first caused to flex outwardly, causing bead 21A of the ring to bypass bead 14A of the ring and then to be socketed thereunder.

Coupling ring 12 is also provided with an outwardly-extending flange 22. When the ring is snapped in place on the base, flange 22 then lies in parallel relation with ledge 15 to provide a narrow annular channel therebetween, within which one may insert a large coin or a flat blade, which, when twisted, causes the ring to unsnap from the ridge.

In assembling the terrarium, first the mouth of the dome is brought down over shell 19 on the base and is centered so that outwardly-extending skirt 11A of the dome then is interposed between ridge 14 and the loose coupling ring 12 thereabove. It is to be noted that the diameter of the mouth of the dome is somewhat greater than the diameter of shell 19 and somewhat smaller than that of ridge 14, so that the dome is receivable above the base between the shell and thr ridge and is concentric therewith. When the coupling ring is thereafter snapped onto the ridge, it tightly clamps the skirt of the dome therebetween, thereby hermetically sealing the dome without the need for gaskets or other expedients.

It will be seen that the skirt, which is latched in place by coupling ring 12, extends beyond base 10 of the assembly. In practice, once the skirt is properly clamped, the excessive material beyong the base may be cut off, for it serves no useful function.

As pointed out previously, there are various dome formations feasible for use in conjunction with the assembly as long as the dome mouth diameter is appropriate to the assembly and the dome is provided with a skirt making it possible to effect hermetic sealing thereof. The interchangeable domes, in all instances, are provided with mouthpieces or valves to permit inflation and erection thereof.

Applications

The inflatable terrarium makes it possible to modify and manipulate the plant environment so that new species and more diverse botanical forms may be cultivated within the home.

Most home environments, in terms of atmospheric conditions, vary somewhat from corner to corner and from room to room. But with modern central heating and air conditioning, the typical room atmosphere is generally dry and in fact is excessively so. While a number of factors come into play with regard to the health and survival of a plant, the atmosphere to which the plant is subjected is a major consideration. For the most part, a low humidity atmosphere is deleterious to the health of a typical house plant.

Because a terrarium in accordance with the invention may be inflated with a selected gas, a controlled environment may be created conductive to the growth of the plant. And because the terrarium is hermetically sealed, the atmospheric conditions therein are independent of the room atmosphere in which the terrarium is placed.

Two-way valve 16 makes it possible to operate the terrarium as a gas isolation chamber in order to promote the growth of the plant contained therein or for various other purposes such as seed germination. Thus if the chamber is to be filled with carbon dioxide, the valve is first set in its first position in which the exhaust outlet is open. In this setting, the incoming gas first serves to displace the air from the chamber. When after a few seconds the air is fully displaced, the valve is set to its second position in which the exhaust outlet is closed and all incoming gas then feeds into the envelope to inflate the envelope until it assumes its erect configuration. It has been found that in a carbon-dioxide atmosphere, the germination time of seeds can be decreased by as much as 50 percent.

In stead of a two-way valve, the envelope may be provided with an inlet valve such as that employed in an automobile tire, plus a separate exhaust port provided with a stopper, the exhaust port being opened only when the air in the envelope is to be displaced. In practice, the gas fed into the terrarium may be used to create an internal environment well above normal atmospheric pressure to subject the plant to a pressureized environment.

The isolation chamber may also be used to prolong the bloom of cut flowers. When flowers are cut and remain exposed to ambient air, oxygen decay takes place so that the flowers proceed to wilt and lose their bloom or color in a matter of hours. But by placing the cut flowers in an inflatable terrarium having a dome of adequate size and shape, and then inflating the terrarium with pure nitrogen, oxygen decay is arrested and the cut flowers can be shipped or stored without significant loss of freshness or bloom for a prolonged period. Under such controlled conditions, using virtually pure nitrogen, orchids have been successfully stored for a 7 to 8-month period.

One may introduce a dessicant into the sealed chamber, the dessicant acting in conjunction with the nitrogen atmosphere to further prolong the life of cut flowers and also to intensify their color. Flower pigments are water-soluble and the dessicant functions to extract the moisture from the atmosphere. Such moisture would otherwise cause cut flowers to bleed their colors.

The terrarium may also be used to ripen fruit or to retard their spoilage. When fruit is stored in the inflated terrarium in a pure nitrogen atmosphere, spoilage of the fruit is retarded and the fruit may be preserved for a prolonged period. And where the fruit is fresh-picked and green, the ripening thereof may be induced by inflating the terrarium enclosure with ethylene gas.

Also, one may include in the atmosphere of the enclosure a variety of fumigant sprays or make use of solid vapor strips to provide fumigation to destroy plant pests. It has also been found that by exhaling cigarette smoke into the chamber, most plant pests may be exterminated.

The inflatable terrarium may also be used to grow anaerobic bacteria by providing an oxygen-free isolation chamber. Anaerobic bacteria are those bacteria which for growth require a reduction or strict exclusion of oxygen from the environment. In some instances, organisms will grow aerobically in the dark, and for this purpose one may provide inflatable plastic domes made of opaque material.

Because the inflatable chamber formed of flexible plastic material is capable of being internally-pressurized well above atmospheric pressure to an extent determined by the strength of the plastic material, a positive pressure may be produced therein to promote plant development to stimulate other types of organic activity, such as bacterial growth.

The inflatable chamber in this instance functions as a low-cost but effective hyperbaric chamber. It is believed that the positive-pressure environment enhances external molecular activity and that as a result many biological reactions are stimulated.

In organic growth, time is not an absolute factor, for it is merely a measurement of chemical reactions taking place in sequence. Thus when plant bulbs are "forced" by putting them in the refrigerator, the plants, in effect, pass through a full winter cycle in a relatively brief period, for the plants experience time only in terms of a sequence of chemical reactions.

By augmenting the number of molecular reactions, we are in fact compressing the time scale over which these biological reactions would otherwise transpire. It is known that by various combinations of positive pressure and elevated temperature, one may accelerate plant growth; but a plateau is ordinarily reached, beyond which no further acceleration is possible. This level varies from species to species. Thus for each plant, there is a level beyond which a further rise in temperature or pressure will not further promote growth and may in fact be destructive to plant life.

This leveling-off limitation is believed due to constraints inherent in the internal molecular reactions within the plant. These may be overcome by ultrasonic stimulation, as by means of an ultrasonic transducer attached to the base of the terrarium assembly, or by chemical stimuli.

Terrarium Toy

Referring now to FIG. 4, there is shown a water game which makes use of an inflatable chamber by a pair of identical disc-shaped bases 11 and 11' operating in conjunction with coupling rings 12 and 12' of the type disclosed in conjunction with FIG. 1. But instead of a dome as in FIG. 1, use is made of a collapsible cylindrical tube 25 formed of clear, flexible plastic material and provided with an inlet valve 26 to permit inflation of the tube.

The ends of tube 25 are provided with skirts, as in FIG. 1, which are clamped between the bases and the coupling rings to define a hermetically-sealed play chamber.

Installed in a central opening in base 11 is the barrel of a toy water pistol 27, and similarly installed in an opening in base 11' is the barrel of a toy water pistol 28, the barrels being secured to the bases by flexible or elastic sealing membranes 29 and 30.

Bridging bases 11 and 11' are a pair of parallel wires 31 and 32, the wires being disposed on either side of the longitudinal axis joining the barrels of the pistols. sliding on wires 31 and 32 and suspended therefrom are light-weight targets 33 and 34, respectively, each target being formed by a circular plate having an eyelet attached thereto for engaging the wire.

Water is supplied to the internal trigger-operated pump of pistol 27 by means of a connecting pipe 35 coupled to a water well 36 in the form of a cup attached to the lower midsection of tube 25 and surrounding an opening therein. Similarly, a pipe 37 connects well 26 with the internal pump of pistol 28. Thus the water emitted by each pistol returns to the well for recirculation, and there is no need to refill the pistols.

Because of the membrane mountings, each pistol may be aimed at any desired angle within the play chamber to shoot a stream of water so as to impinge on either target. The object of the game is for each player to try to force his own target to the opponent's side of the chamber.

The game strategy is such that the players can either hit their own targets or their opponent's so that as a player advances his own target in the proper direction, he can from time to time hit his opponent's target to reverse its direction of movement and thereby prevent its arrival at his side.

While there have been shown and described preferred embodiments of an Inflatable Terrarium Assembly with Controlled Environment in accordance with the invention, it will be appreciated the many changes and modifications may be made therein without, however, departing from the essential spirit thereof.

Thus another application for the inflatable terrarium assembly is as a display case for watches and articles of jewelry which may be protectively housed within the inflated terrarium. The advantage of this application is that it makes it possible to display precious articles on a store counter and yet discourage theft.

I claim:

1. A collapsible terrarium assembly for protectively housing an organic product in a controlled environment comprising:

A. a base having a circular ridge formed on the upper face thereof adjacent to and concentric with the periphery of the base;
   B. a replaceable dome mountable on the base and constituted by a flexible, non-self-supporting bag fabricated of plastic film material having a circular open mouth from which an annular skirt extends outwardly, the diameter of the mouth being somewhat smaller than the diameter of the ridge, whereby the dome is seated within the ridge and the skirt lies thereover;
   C. a removable coupling ring attachable to the ridge to clamp the skirt of the dome therebetween to hermetically seal the dome to define an enclosure; and
   D. means to inflate the dome with a gas to cause the dome to assume an erect form, said gas being substantially free of oxygen and providing a controlled environment for said product.

2. An assembly as set forth in claim 1, wherein said dome is inflated to a pressure substantially above atmospheric pressure to form a hyperbaric chamber.

3. An assembly as set forth in claim 1, wherein said product is unripended fruit and said gas is ethylene gas.

4. An assembly as set forth in claim 1, wherein said gas includes a fumigant.

5. An assembly as set forth in claim 1, wherein said means includes a two-way valve secured to the dome and coupled by a line to a tank containing said gas under pressure, said valve having an exhaust outlet whereby in one position of the valve said outlet is open whereby incoming gas displaces the air from the dome, and in a second position said outlet is closed to cause said gas to fill and inflate the dome.

6. An assembly as set forth in claim 1, wherein said gas is carbon dioxide.

7. An assembly as set forth in claim 3, wherein said product is in the form of seeds whose germination is promoted by carbon dioxide.

8. An assembly as set forth in claim 1, wherein said gas is nitrogen.

9. An assembly as set forth in claim 8, wherein said product is cut flowers.

10. An assembly as set forth in claim 9, wherein a dessicant is included in said environment to remove moisture therefrom and thereby prevent the color of said flowers from bleeding.

11. An assembly as set forth in claim 8, wherein said product is anaerobic bacteria whose growth is promoted by said nitrogen.

* * * * *

UNITED STATES PATENT OFFICE
CERTIFICATE OF CORRECTION

Patent No. 4,128,966    Dated December 12, 1978

Inventor(s) Donald Spector

It is certified that error appears in the above-identified patent and that said Letters Patent are hereby corrected as shown below:

Column 3, lines 10 and 11 "Ridge 14 is provided of the base to define an outer ledge 15." should be deleted.

Column 4, line 9, "thr" should have read -- the --

Column 4, line 45 "conductive" should have read -- conducive --

Column 4, line 65 "In stead" should have read -- Instead --

Column 5, line 4 "pressureized" should have read
 -- pressurized --

Column 6, line 66 "the" should have read -- that --

Claim 3, line 2 "unripended" should have read -- unripened --

Signed and Sealed this

Twelfth Day of February 1980

[SEAL]

Attest:

SIDNEY A. DIAMOND

Attesting Officer    Commissioner of Patents and Trademarks